(12) United States Patent
Okamura et al.

(10) Patent No.: US 7,059,963 B2
(45) Date of Patent: Jun. 13, 2006

(54) PITCHED BATTLE TYPE OF RALLY GAME PROGRAM AND GAME MACHINE

(75) Inventors: Noriaki Okamura, Tokyo (JP); Shigemitsu Takamiya, Suita (JP)

(73) Assignee: Konami Corporation, Tokyo (JP)

( * ) Notice: Subject to any disclaimer, the term of this patent is extended or adjusted under 35 U.S.C. 154(b) by 631 days.

(21) Appl. No.: 10/242,147

(22) Filed: Sep. 12, 2002

(65) Prior Publication Data
US 2003/0050105 A1    Mar. 13, 2003

(30) Foreign Application Priority Data
Sep. 13, 2001    (JP)    ............... 2001-278681

(51) Int. Cl.
   *A63F 9/24*    (2006.01)
(52) U.S. Cl. ................. 463/3; 463/4; 463/42
(58) Field of Classification Search .......... 463/3, 463/7, 2–4, 42; 273/317.4; 473/415, 473, 473/474, 475
See application file for complete search history.

(56) References Cited

U.S. PATENT DOCUMENTS

| | | | | |
|---|---|---|---|---|
| 4,215,861 A | * | 8/1980 | Nemeth | ............ 463/3 |
| 4,915,384 A | * | 4/1990 | Bear | ............ 473/451 |
| 5,816,953 A | * | 10/1998 | Cleveland | ............ 473/459 |
| 6,135,456 A | * | 10/2000 | Cooper | ............ 273/371 |
| 6,244,956 B1 | * | 6/2001 | Nakayama et al. | ............ 463/3 |
| 6,334,813 B1 | * | 1/2002 | Rimoto et al. | ............ 463/3 |
| 6,371,849 B1 | * | 4/2002 | Togami | ............ 463/4 |
| 6,431,982 B1 | * | 8/2002 | Kobayashi | ............ 463/4 |
| 6,461,237 B1 | * | 10/2002 | Yoshinobu et al. | ............ 463/3 |

OTHER PUBLICATIONS

Kadokawa Shoten, "Kadokawa Game Collection SD Gundam Generation F Super Secret Conquest Guide Book FG~V GUNDAM Version", pp. 11, 13, 27, and English Translation of major parts (Sep. 13, 2000).
Soft Bank KK, "Mobile Suit GUNDAM 'Ambition of Giren' Perfect Guide", pp. 6, 7, 22, 25, and English translation of major parts (Apr. 30, 1998).

* cited by examiner

*Primary Examiner*—Monica Carter
*Assistant Examiner*—Kesha Frisby
(74) *Attorney, Agent, or Firm*—Fish & Richardson P.C.

(57) ABSTRACT

A program has routines S3, S4 of computing an attack form AP of a first character 22 on the basis of an instruction by a player, a routine S4 of computing and displaying an attack probability AR according to the instruction of the attack position by the player, a routine of automatically proceeding a game after the attack form is computed and set, and routines S5, S6, S13, S14 of controlling to display an attack action and a defense action of a ball by the first and the second characters with a series of pictures in the routines. After the player instructs the attack form, the attack action and the defense action of the ball are displayed with a series of pictures. The player can concentrate on the instruction action of the attack form, and can enjoy a brain play.

12 Claims, 3 Drawing Sheets

PITCHED BATTLE TYPE OF RALLY GAME PROGRAM AND GAME MACHINE

BACKGROUND OF THE INVENTION

This invention relates to a pitched battle type of rally game program suitable for applying to a pitched battle type of rally game wherein character(s) displayed on a display is (are) operated so as to hit a game target, such as a ball and a shuttlecock of tennis, table tennis, badminton and the like, into the point area on the opponent's side through the rally of the game target for getting a point.

Almost all of such conventional pitched battle type of rally games is for competing in reflexes in such a manner that own character is rapidly moved corresponding to the ball hit by an opponent's character so as to timely return since the game is composed in imitation of an actual rally game.

But, it is impossible to compete in a brain play, such as tactics and attack strategy which is original for tennis with such a conventional game, and then, the person who actually plays tennis feels something lacking since the game is simple. Besides, such a game is uninteresting for persons of middle and advanced age whose the reflexes weakens since reflexes is a big element for determining the issue of the game, and is anything but an enjoyment for all ages including a child and an adult.

The object of the present invention is to provide a pitched battle type of rally game and a game machine through which people can enjoy a brain play.

SUMMARY OF THE INVENTION

The present invention is a pitched battle type of rally game program, comprising:

said pitched battle type of rally game program being program for getting a computer to execute a routine of controlling so as to display a pitched battle type of rally game (tennis game, for instance) wherein a character displayed on a display is controlled to move on a court displayed on said display so as to hit a game target (A medium to be exchanged between players playing sports game for rally, such as a ball and a shuttlecock is referred to as "a game target" in the present specification.) into a point area on an opponent's side through a rally of said game target for scoring; and said pitched battle type of rally game program being a program for further getting said computer to execute following routines:

a first attack form computing and setting routine (Steps S3, S4 of a game proceeding program GPP, for instance) for computing and setting an attack form (such as an attack position AP and a kind of a ball) into said point area on said opponent side by a first character on the basis of an instruction of a player;

an attack probability computing and displaying routine (Step S4 of the game proceeding program GPP, for instance) provided at said first attack form computing and setting routine, for computing an attack probability at an attack position according to said attack position instructed by said player and controlling to display said attack probability computed on said display;

an automatic proceeding mode proceeding routine for proceeding a game without waiting an input to be instructed by said player after said attack form by said first character is computed and set by said first attack form computing and setting routine;

a first display routine (Step S5 and Step S6 of the game proceeding program GPP, for instance) for controlling to display an attack action of said game target by said first character and a defense action ("Defense action" in the present specification has a meaning corresponding to the attack action by an opponent's character, does not always means only "defending". "Defense action" off course includes the element of "counterattack/attack" against the opponent's character.) corresponding to said attack action by a second character competing with said first character on said display with a series of pictures in said automatic proceeding mode; and a second display routine (Step S13 and Step S14 of the game proceeding program GPP, for instance) for controlling to display said attack action of said game target against said first character by said second character and said defense action corresponding to said attack action by said first character on said display with a series of pictures in said automatic proceeding mode.

According to this invention, after the player instructs the attack form against the competing second character by the first attack form computing and setting routine, the first display routine (Step S5 and Step S6 of the game proceeding program GPP, for instance) controls to display the attack action of the game target by the first character and the defense action corresponding to the attack action by the second character competing with the first character on the display with a series of pictures, and the second display routine (the Step S13, Step S14 of the game proceeding program GPP, for instance) controls to display the attack action of the game target by the second character against the first character and the defense action corresponding to the attack action by the first character on the display with a series of pictures by the automatic proceeding mode proceeding routine. Then, the player can concentrate on the instruction action of the attack form against the opponent, for which most strategic consideration is needed in such a rally game, and it is not necessary to operate a simple attack action by only competing in reflexes or the defense action against the game target of the opponent thereafter, and the player can enjoy a brain play, such as tactics and attack strategy which are original for rally game.

Besides, the first display routine controls to display the attack action of the game target by the first character and the defense action corresponding to the attack action by the second character competing with the first character on the display with a series of pictures. Then, the attack form instructed by the player can be displayed and controlled without depending on the reflexes of the player, being influenced by an environment wherein top players play by properly setting the contents of a series of pictures so as to increase the interests of the game.

Furthermore, the attack probability computing and displaying routine computes the attack probability in the attack position according to the instruction of the attack position by the player and displays the attack probability computed on the display, thereby the player can properly select the attack position, referring to the attack probability, and even the player, who does not actually know such a rally game, can easily select the attack position and enjoy the game. In addition, higher game tactics is possible, referring to the attack probability.

Besides, the present invention is the pitched battle type of rally game program wherein said attack probability is computed so as to change according to said attack position in said point area on said opponent's side.

According to this invention, the attack probability is computed so as to be changed according to the attack position in the point area on the opponent's side, thereby the success probability of the attack in the attack position of the actual rally game can be properly reflected so as to provide a real rally game.

Besides, the present invention is the pitched battle type of rally game program wherein said attack probability is computed so as to change according to a movement distance between a position where said first character has been until then and a position where said game target is hit from now on by said first character.

According to this invention, the attack probability is computed so as to change according to the movement distance between the position where the first character has been until then and the position where the game target is hit from now on, thereby the change of the success probability at the time of the subsequent attack depending on the distance of the action following the game target in an actual rally game can be accurately reflected so as to provide a real rally game.

Besides, the present invention is the pitched battle type of rally game program wherein said attack probability is computed so as to change according to bodily powers capable of being consumed of said first character at the time of attack action.

According to this invention, the attack probability is computed so as to change according to bodily powers capable of being consumed of said first character at the time of attack action, thereby such a natural condition in a normal life that the attack probability is changed according to the bodily powers of the character can be reflected, and a natural game development can be controlled on the display.

Besides, the present invention is the pitched battle type of rally game program wherein said attack probability is computed so as to change according to a correction value increased or decreased according to a development of a scenario (spirit, for instance).

According to this invention, the attack probability is computed so as to change according to a correction value increased or decreased according to the development of a scenario (sprit, for instance), thereby human emotional elements can be reflected so as to provide a more real game program.

Besides, the present invention is the pitched battle type of rally game program wherein said pitched battle type of rally game program is a program for further getting said computer to execute a time limiting routine for starting to clock a predetermined time (such as a remaining time RT) since said first attack form computing and setting routine is started and controlling to limit the execution of said first attack form computing and setting routine within said predetermined time.

According to this invention, the execution time of the first attack form computing and setting routine by the player can be limited by the time limiting routine, thereby tense game can be developed, approximating to an actual game.

Besides, the present invention is the pitched battle type of rally game program wherein a counterattack probability computing and displaying routine is provided in said first attack form computing and setting routine, for computing a counterattack probability at said attack position by said second character according to said attack position instructed by said player and displaying said counterattack probability computed on said display.

According to this invention, the counterattack probability of the second character is computed and displayed in the first attack form computing and setting routine, thereby the player can plan a higher strategy so as to increase the interest of the game.

Besides, the present invention is the pitched battle type of rally game program wherein said counterattack probability is computed so as to change according to a movement distance between a position where said second character has been until then and a position where said game target is defended from now on by said second character.

According to this invention, the counterattack probability is computed so as to change according to a movement distance between a position where the second character has been until then and a position where the game target is defended from now on, thereby the change of the success probability at the time of the subsequent defense depending on the distance of the action following the game target in an actual rally game can be accurately reflected so as to provide a real rally game.

Besides, the present invention is the pitched battle type of rally game program wherein said counterattack probability is computed so as to change according to bodily powers capable of being consumed of said second character at the time of performing defense action of said game target.

According to this invention, the counterattack probability is computed so as to change according to bodily powers capable of being consumed of the second character at the time of performing defense action of the game target, thereby such a natural condition in a normal life that the attack probability is changed according to the bodily powers of the character can be reflected, and a natural game development can be controlled on the display.

Besides, the present invention is the pitched battle type of rally game program wherein said counterattack probability is computed so as to change according to a correction value (sprit, for instance) increased or decreased according to a development of a scenario.

According to this invention, the counterattack probability is computed so as to change according to a correction value (sprit, for instance) increased or decreased according to a development of a scenario, thereby human emotional elements can be reflected so as to provide a more real game program.

Besides, the present invention is the pitched battle type of rally game program wherein said pitched battle type of rally game program is a program for further getting said computer to execute a second attack form computing and setting routine (Step S9 and Step S10 of the game proceeding program GPP, for instance) for computing and determining said attack form of said game target against said first character by said second character.

According to this invention, a second attack form computing and setting routine (Step S9 and Step S10 of the game proceeding program GPP, for instance) computes and determines the attack form of the game target against the first character by the second character, thereby the actions of the second character can be set so as to be programmable and higher rally between the characters can be also realized by setting a complex attack form.

Besides, the present invention is the pitched battle type of rally game program wherein said second attack form computing and setting routine has a routine for computing and determining said attack form of said game target on the basis of an instruction of said player.

According to this invention, the second attack form computing and setting routine computes and determines the attack form of the game target on the basis of an instruction of the player, thereby the player concerning the second character can participate, and the competition with two players is also possible.

Besides, the present invention is a pitched battle type of rally game program, comprising:

said pitched battle type of rally game program being program for getting a computer to execute a routine of controlling so as to move first and second characters displayed on a display on a court displayed on said display and so as to display said pitched battle type of rally game wherein said first and said second characters rally by said game target;

said pitched battle type of rally game program being a program for executing a routine of further getting said computer to alternately repeat following a series of routines concerning said character for said first and said second characters till rally finish is judged in a judging routine:

(a) an attack form computing and setting routine (Step S3 and Step S4 of the game proceeding program GPP, for instance) of computing and setting an attack position of said game target by said character and computing and setting an attack probability at said attack position; and (b) a judgement routine of judging as to whether or not said rally is finished on the basis of said attack position and said attack probability computed and set, and a position of other character rather than said character on said court; and said attack form computing and setting routine having such a characteristic that said attack position concerning at least one of said first and said second characters is computed and set on the basis of an input signal from a controller of said computer.

According to this invention, the attack form computing and setting routine and the judging routine are repeated till the rally finish, the issue of the rally is determined by the attack probability computed by the attack form computing and setting routine and the position on the court of the other character, and does not depend on the reflexes of the player. Therefore, it is sufficient to instruct the attack position in the attack form computing and setting routine in the routines repeated through the controller for the player. Then, the player can concentrate on the instruction action of the attack position against the opponent, for which most strategic consideration is needed in such a rally game, and it is not necessary to operate a simple attack action by only competing in reflexes or the defense action against the game target of the opponent thereafter, and the player can enjoy a brain play, such as tactics and attack strategy which are original for rally game.

Furthermore, the attack probability in the attack position is computed and set, thereby the player can properly select the attack position, referring to the attack probability, and even the player, who does not actually know such a rally game, can easily select the attack position and enjoy the game. In addition, higher game tactics is possible, referring to the attack probability.

DESCRIPTION OF THE PREFERRED EMBODIMENTS

An embodiment of the present invention will now be explained hereinafter, referring to drawings.

Figure 1:
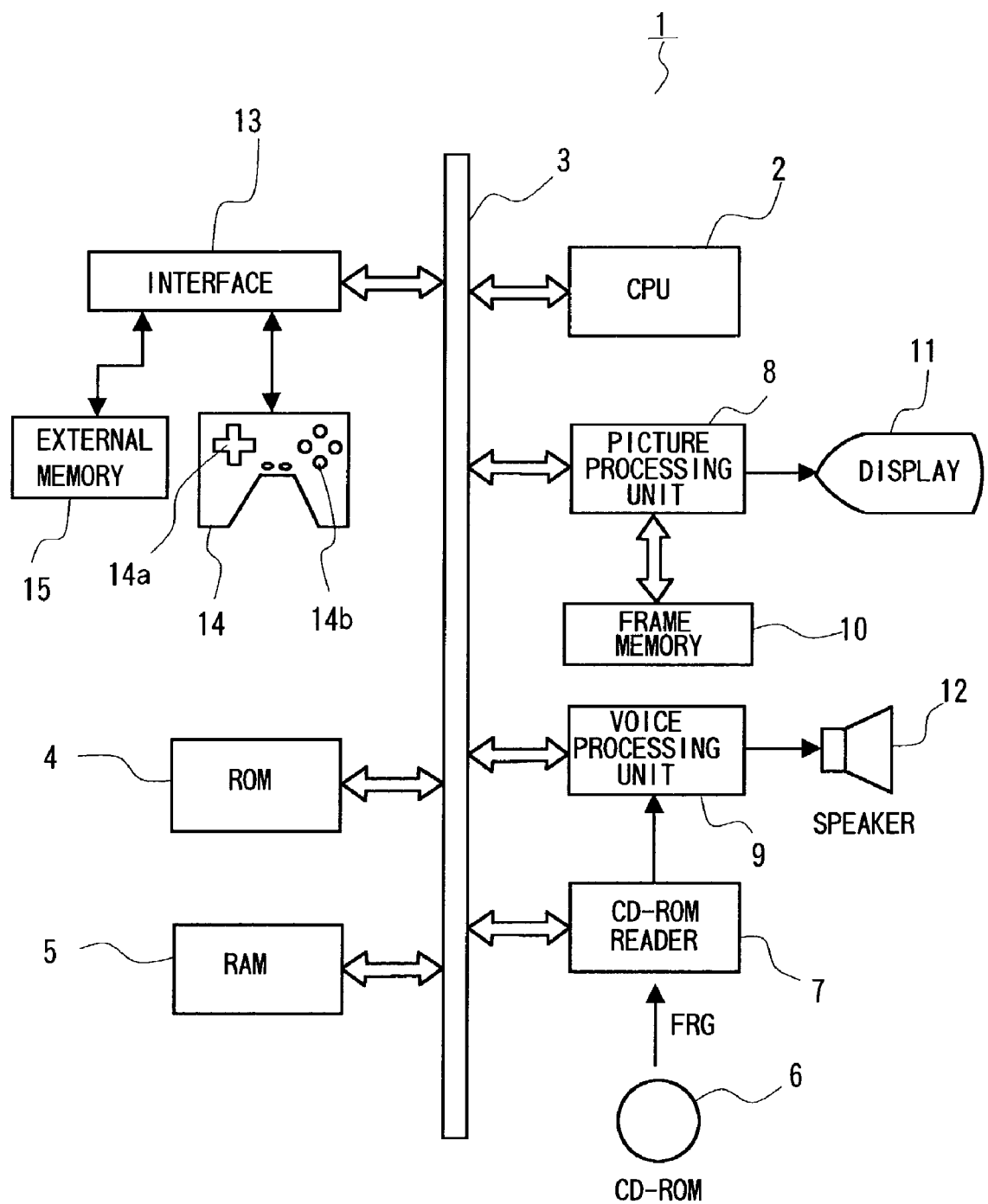
FIG. 1 is a block diagram of a home-use game machine to which the present invention is applied.
Figure 2:
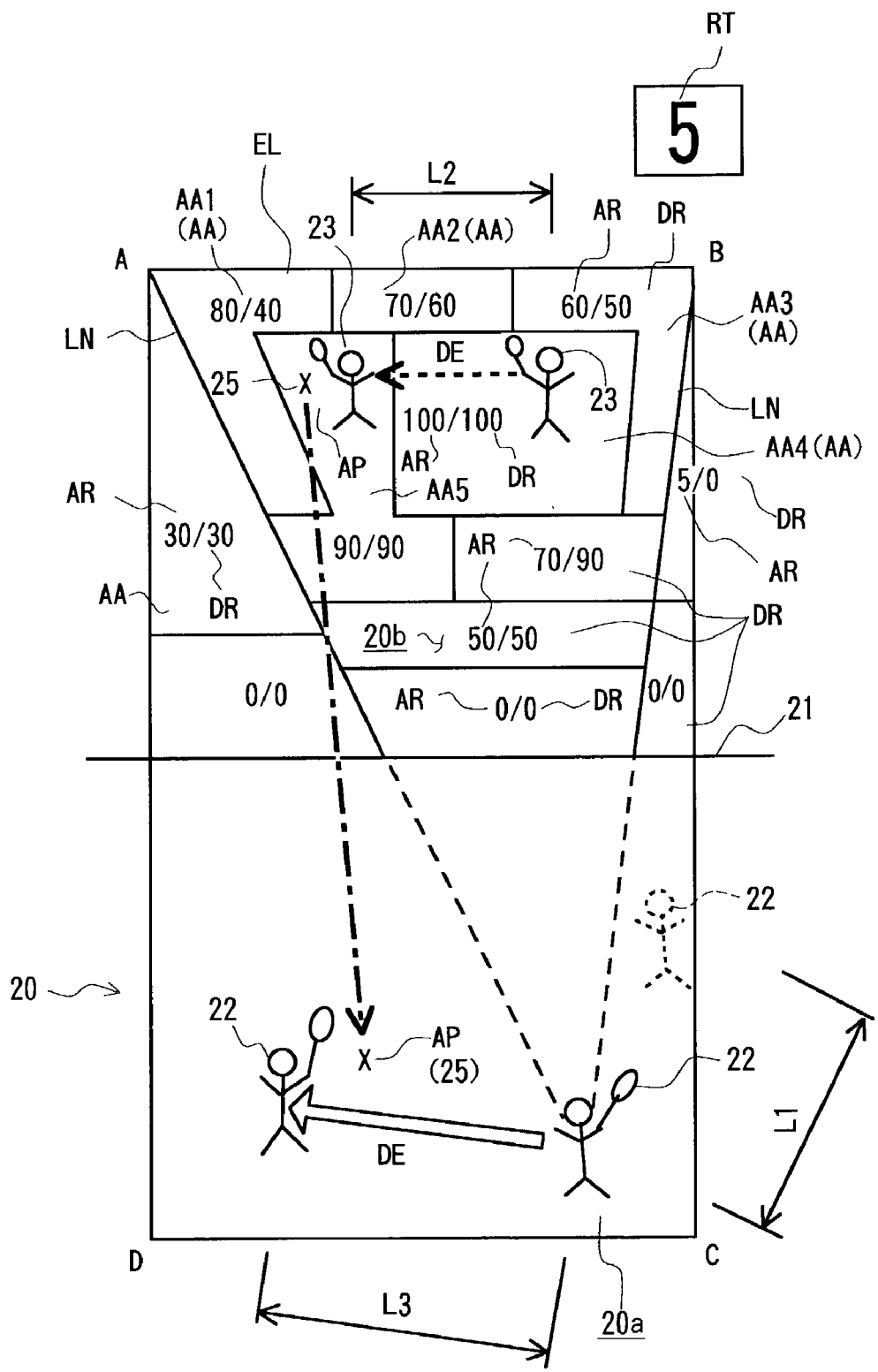
FIG. 2 is a view for showing an example of a court shown on a display.
Figure 3:
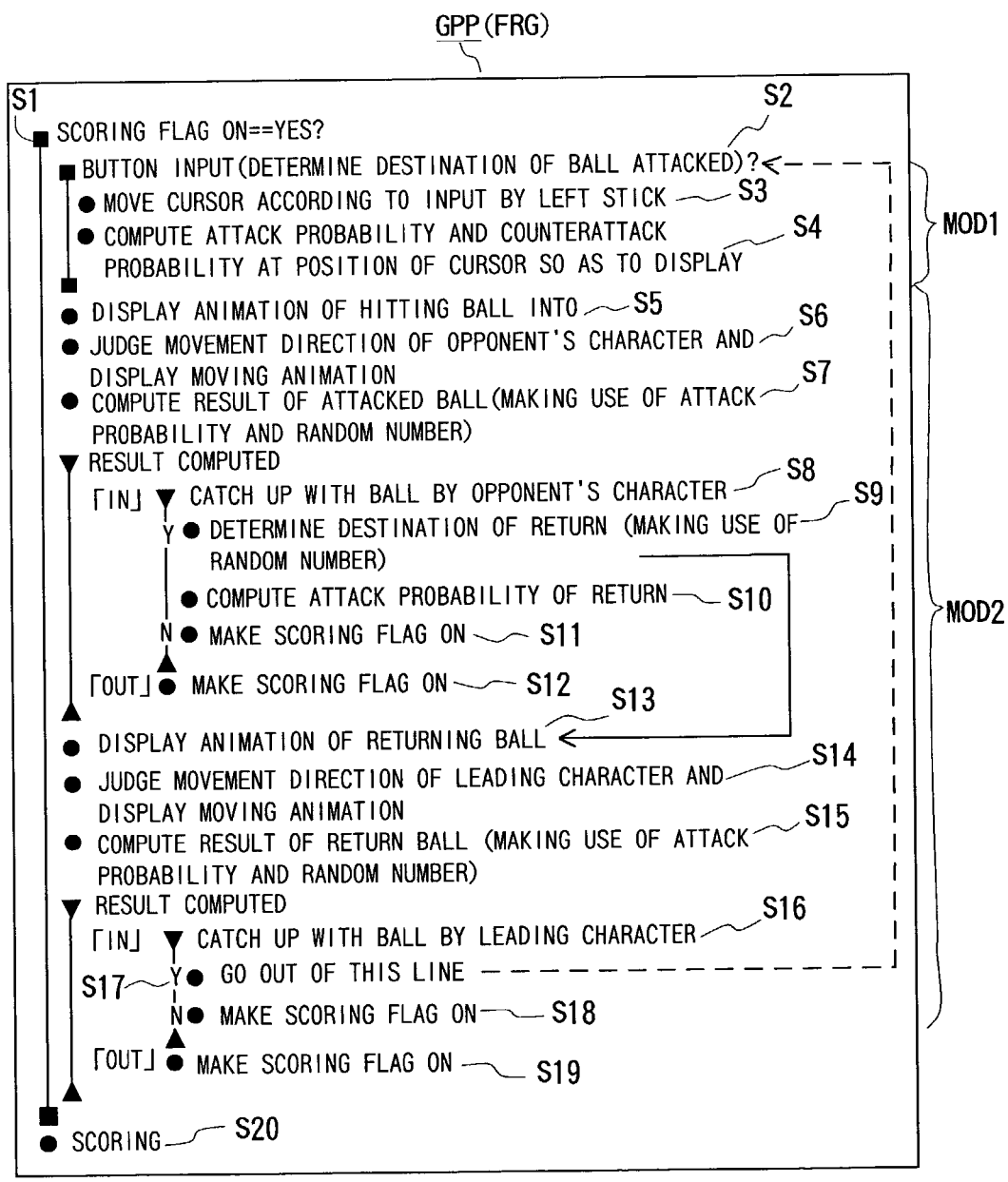
FIG. 3 is a view for showing an example of a game proceeding program in a game of tennis.

FIG. 1 is a block diagram of a home-use game machine to which the present invention is applied, FIG. 2 is a view for showing an example of a court shown on a display, and FIG. 3 is a view for showing an example of a game proceeding program in a game of tennis.

A game machine 1 has a CPU 2 comprised with a microprocessor unit as a main body, as shown in FIG. 1 With the CPU 2, a ROM 4 and a RAM 5 as main memory units are connected through a bus 3. In the ROM 4, an operating system as a program necessary for the control of the whole operations of the game machine 1 and the data necessary for its execution are stored. In the RAM 5, a program for game and the data read from a CD-ROM 6 as a storage medium through a CD-ROM reader 7 are stored. Besides, in the RAM 5, an area for temporarily storing various information necessary for a game proceeding is set according to the program read from the CD-ROM 6. Furthermore, the image data read from the CD-ROM 6 and machined by the CPU 2 are also stored in a predetermined video area secured in the RAM 5. On this occasion, another RAM dedicated for imaging process may be separately provided. The game program may be supplied by a semiconductor memory, a DVD-ROM or another various kinds of storage mediums in place of the CD-ROM 6. Furthermore, the image data read from the CD-ROM 6 and machined by the CPU 2 are also stored in a predetermined video area secured in the RAM 5. On this occasion, another RAM dedicated for imaging process may be separately provided. The game program may be supplied by a semiconductor memory, a DVD-ROM or another various kinds of storage mediums in place of the CD-ROM 6.

And, a picture processing unit 8 and a voice processing unit 9 are connected with the CPU 2 through the bus 3. The picture processing unit 8 draws a game scope on a frame memory 10 by reading image data from the video area of the RAM 5, and converts the image drawn into a video signal for displaying on a display 11 so as to output the signal with a predetermined timing. The voice processing unit 9 converts the sound data on the CD-ROM 6 read by the CD-ROM reader 7 into a predetermined analog voice signal so as to output from a speaker 12. And, the voice processing unit 9 produces data of effective sounds or musical sounds according to the instruction from the CPU 2 and converts the data into an analog signal so as to output from the speaker 12. As the display 11 and the speaker 12, a home television receiver and a speaker attached thereto are generally used.

A controller 14 and an external memory 15 are attachably and detachably connected with the bus 3 through an interface 13. The controller 14 is provided with operating members for receiving an operation by a player. For instance, a cross key 14a for inputting the directions of up and down and right and left, a push-button switch 14b and the like are provided as the operating member. A signal corresponding to the operating state of the operating members 14a, 14b is output at predetermined cycles (at sixty cycles per a second, for instance) from the controller 14, and the CPU 2 judges the operating state of the controller 14 on the basis of its signal. The external memory 15 has a semiconductor storage element capable of rewriting and holding memory, and the data showing the proceeding state of a game and the like are stored therein according to the instruction of a player. On this occasion, the external memory 15 may be provided as an element comprising a portable game machine capable of attaching to and detaching from the interface 13, for instance.

On the CD-ROM 6, the program and the data for executing a pitched battle type of rally game are stored. FIG. 2 is an example of a court 20 stored in the CD-ROM 6 at the time of tennis play which is an example of a pitched battle type of rally game, and the court 20 is separated off by a net 21 of the center portion into upper portion and lower portion. The lower court of the net 21 in the figure is set as an own court 20a, and the upper court of the net 21 in the figure is set as an opponent's court 20b.

In the game machine 1, the CPU 2 firstly executes a predetermined initialization process according to the program of the ROM 4 after a predetermined initialization operation (the operation of turning the power on, for instance). When the initialization finishes, the CPU 2 starts to read a pitched battle type of rally game program FRG according to the present invention which is stored on the CD-ROM 6, and starts game processing according to the program. When a player executes a predetermined game start operation on the controller 14, the CPU 2 starts various processing necessary for the execution of a game according to the routines of the pitched battle type of rally game program FRG on the basis of the instruction.

Thereafter, the game machine 1 executes predetermined routines according to the pitched battle type of rally game program FRG already read, and controls to display the image shown on the display 11 so as to control the proceeding of the game of tennis on the scope. The game of tennis with this pitch battle type of rally game program FRG is basically controlled in such a manner that the picture of the court 20 (as shown in FIG. 2) wherein the game is played is produced by the picture processing unit 8 according to court picture display routine stored in the pitched battle type of rally game program FRG so as to display on the display 11. On this occasion, a leading character 22 operated by a player with the controller 14, and an opponent's character 23 automatically operated by the CPU 2 on the basis of opponent's character behavior routine of the pitched battle type of rally game program FRG (only "program FRG" hereinafter) are controlled so as to display on the basis of the program FRG.

Of the program FRG, a game proceeding program GPP concerning proceeding of a tennis game will now be explained in detail on the basis of FIG. 3.

In the game proceeding program GPP, as to whether scoring with game proceeding is executed or not is judged by whether a scoring flag is ON or not in Step S1. The scoring flag is OFF since this first stage is the stage just after the game starts. So, the program proceeds to Step S2.

A player is requested on the display 11 to determine a destination place to be smashed of a game target by key input through the cross key 14a or the push-button switch 14b on the controller 14 in Step S2. Receiving this request, the player operates the cross key 14a, that is, the left stick in up or down direction or in right or left direction. The CPU 2 executes arithmetic control for properly moving a cursor 25 on the opponent's court 20b where a ball is smashed into from now on by the player of the display 11, corresponding to the operation of the cross key 14a.

On this occasion, the CPU 2 computes and displays an attack probability AR and a counterattack probability DR of the place where the cursor 25 is displayed at the present concerning the opponent's court 20b where an opponent's character is displayed on the basis of the program FRG, as shown in FIG. 2.

This attack probability AR is the probability as to whether or not the ball to be smashed by the leading character 22 from now on can be smashed to the place aimed by the player through the cursor 25. The higher the attack probability is, the higher such probability that the ball is smashed to the place aimed by the player through the cursor 25 is.

This attack probability AR is computed by the CPU 2 on the basis of an attack probability computing and displaying routine stored in the program FRG, and is stored in a predetermined address position in the RAM 5 and is displayed as a concrete numeral on the display 11, as shown in FIG. 2.

The computing routine of the attack probability AR on the basis of the program FRG is executed as follows. That is, it can be obtained by the following equation.

Attack probability=base probability*conditions fluctuation*action fluctuation

The base probability in this case is computed by a bodily powers value showing bodily powers capable of being consumed in a game which is set on the leading character 22 and a spirit correction value to be added, depending on the development of a scenario of a game. The bodily powers value is computed on the basis of a bodily powers value computing routine set in the program FRG according to the progress of tennis technique of the leading character in a game, the time elapsed from game start, the contents of a play in a game and the like. And, the spirit correction value is a parameter by which the bodily powers value computed by the bodily powers value computing routine can be increased or decreased within the bounds of −50% through +50% for instance according to the development of a scenario of a game. In case where the leading character 22 is cheered by a likable woman in a game for instance, the parameter is increased in a positive (+) direction. On the contrary, the parameter is transferred in a negative (−) direction in case where the leading character 22 has a fear of deathblow action which may be realized by the opponent's character in a game.

The conditions fluctuation is a parameter depending on a movement distance L1 between a point where the leading character 22 has been till then, that is, a position where the last ball has been smashed to the opponent's character 23 (a ball of the opponent character 23 has been defended) (the position of the leading character 22 as shown by a dashed line of FIG. 2) and a position to be smashed from now on. When the movement distance L1 is long, the leading character 22 should move long distance in a short time till he catches up with a ball. So, the receiving posture is unstable for this reason, and it is disadvantageous for the leading character 22, the parameter of the conditions fluctuation is decreased, and the attack probability AR is decreased. On the contrary, it is enough to move slight distance for the leading character 22 for catching up with a ball when the movement distance L1 is short. Then, there is low probability of getting out of the receiving posture, it is advantageous for the leading character 22, the conditions fluctuation is increased, and the attack probability AR is increased.

And, the conditions fluctuation is a parameter changeable depending on what kind of ball is smashed to any position of the opponent's court 20b. As shown in FIG. 2 for instance, the opponent's court 20b is divided into a plurality of attack areas AA by computing according to the present position of the leading character 22 on the basis of the attack area computing routine stored in the program FRG, and the parameter concerning to which position a ball is smashed is set for the attack area AA, computed so as to be divided, according to the degree of difficulty of the ball smashed by the leading character 22. In case of FIG. 2, the conditions fluctuation of areas AA1, AA2 and AA3 along Lines LN connecting between the leading character 22 and both ends A, B of the opponent's court 20b and an end line EL is a low value since high technique is necessary for attack, and the attack probability AR is decreased. And, the conditions fluctuation of areas AA4, AA5 of the center portion of the opponent's court 20b is a high value since the attack technique to these areas is not so high, and the attack probability AR is increased. Besides, the parameter of the conditions fluctuation is changed concerning the kind of a ball to be hit by the leading character 22, such as a strong hit, a lob and a spinning ball. When a ball having high degree of difficulty is hit, the conditions fluctuation is a low value and the attack probability AR is decreased.

The attack probability AR computed in this way is computed concerning the point indicated by the player through the cursor 25 as shown in Step S4, and is displayed on the display 11 every each attack area AA. On this occasion, the computing routine of the attack probability AR, and setting form of each parameter for computing the attack probability AR are completely optional, and can be properly set according to the character of a pitched battle type of rally game, an appearing character, and development of a scenario.

The CPU 2 computes the attack probability AR on the basis of the program FRG concerning the position of the cursor 25 indicated by a player so as to display on the display 11, and computes the counterattack probability DR on the basis of the counterattack probability computing and displaying routine stored in the program FRG so as to display on the display 11.

That is, the counterattack probability DR is the probability of correctly returning a ball to the leading character 22 by the opponent's character 23 when a ball is actually smashed by the leading character 22 to a attack position AP instructed by the cursor 25 as a position to which the leading character 22 smashes the ball. The higher the counterattack probability DR is, the higher the probability of returning the ball to the leading character 22 from the opponent's character 23 is.

This counterattack probability DR is computed by the CPU 2 on the basis of the counterattack probability computing and displaying routine stored in the program FRG, as already described, and is stored in a predetermined address position in the RAM 5, and is displayed as a concrete numeral on the display 11 together with the attack probability AR as shown in FIG. 2.

The computing routine of the counterattack probability DR on the basis of the program FRG is executed as follows. That is, it is obtained by the following equation.

Counterattack probability=Base probability*Conditions fluctuation

In the computing of the counterattack probability, the conditions fluctuation, that is, the parameter changeable depending on what kind of ball the opponent's character 23 smashes to any position of own court 20a is not considered. This counterattack probability shows the probability of returning a ball to the opponent's court even in any form at the time of defending, the player can see such probability that a ball which the player hits is returned to own court 20a again by referring to the counterattack probability DR. Then, the place to which a ball is returned by the opponent's character 23 or the kind of a ball is out of the question in this case. In other words, the counterattack probability shows the maximum value of such possibility that the opponent's character 23 can return a ball. On this occasion, the counterattack probability "0" means a ball which the opponent's character 23 can not absolutely receive, and this ball is so-called "ace".

In this way, the attack probability of the leading character 22 and the counterattack probability DR of the opponent's character 23 are displayed at the attack position AP to which the player moves the cursor 25 in Step S4. The player selects the attack position AP to which the leading character 22 hits a ball on the display 11 with reference to the attack probability AR and the counterattack probability DR displayed on the display 11.

On this occasion, the program FRG gets the CPU 2 to execute a time elapsed routine from a start of Step S2 with a timer, and gets the display 11 to control so as to display the result as a remaining time RT through the picture processing unit 8, as shown in FIG. 2. No attack form to be determined by the player within the remaining time RT is regarded as the failure of the defense of the ball by the leading character 22, and the scoring flag is made ON so as to add a point to the opponent's character 23. Then, it is necessary for the player to determine an attack form, such as the determination of the attack position AP against the opponent's character 23 from Step S2 to Step S4 within the remaining time RT gradually reduced by subtracting from a predetermined limited time, the player can operate the controller 14, becoming tense, and the player can feel as if he had actually played.

After finishing the selection of the attack position AP by the player, the program FRG enters into Step S5 so as to enter automatic proceeding mode MOD2 wherein the game goes on with no delay by the automatic operation on the CPU 2 side without needing the input to be instructed by the player, leaving an attack form determining mode MOD1 up to that time. In the automatic proceeding mode MOD2, an animation stored in the program FRG wherein the leading character 22 hits a ball is read out and is controlled so as to display on the display 11 through the picture processing unit 8. Then, such an actual ambience is given to the game.

Subsequently, the CPU 2 enters into Step S6 of the program FRG, and computes a movement direction DE and a movement length L2 on its display according to the attack position AP instructed by the player and the present position of the opponent's character 23, and composes and computes the moving animation corresponding to the movement direction DE and the movement length L2 both computed on the basis of the program FRG so as to display on the display 11.

Subsequently, the CPU 2 executes Step S7 of the game proceeding program GPP, and executes an attack ball result computing routine of computing as to whether or not the ball strongly hit by the leading character 22 actually correctly reaches the attack position AP designated by the player on the basis of the attack probability AR computed in Step S4 and a random number, and executes Step S8 through Step S12 according to the result computed.

In case where the result computed by the attack ball result computing routine is "IN", that is, the ball correctly reaches the attack position AP designated by the player, the program enters in Step S8, and computes as to whether or not the opponent's character 23 catches up with the ball attacked, making use of the counterattack probability DR computed in Step S4 and a random number. When the judgement in Step S8 is that the opponent's character 23 caught up with the ball attacked, the program enters in Step S9. At this time, the program determines a position to be returned against the leading character 22 by the opponent's character 23, that is, the attack position AP, making use of a random number so as to enter in Step S10. On this occasion, the attack probability AR of the opponent's character 23 is computed in a similar way to the computing in Step S4. At the same time, the counterattack probability DR of the leading character 22 when the ball is smashed to the attack position AP is computed so as to display on the display 11.

When the judgement in Step S8 is that the opponent's character 23 did not catch up with the ball attacked, the program enters into Step S11 so as to make the scoring flag ON, and scoring described hereinafter is executed, adding a point to the leading character 22.

When the result computed by the attack ball result computing routine in Step S7 is "OUT", that is, the ball is not correctly smashed to the attack position AP designated by the player, the program enters into Step S12, the scoring flag is made "ON", and the scoring described hereinafter is executed, adding a point to the opponent's character 23.

After the attack point AP against the leading character 22 by the opponent's character 23 is determined in Step S9 and Step S10, the program FRG enters into Step S13, the animation of the return by the opponent's character 23 is read out at this time so as to control to display on the display 11 through the picture processing unit 8. Then, such an actual ambience is given to the game.

Subsequently, the CPU 2 enters into Step S14 of the game proceeding program GPP, and computes the movement direction DE and a movement distance L3 on the display according to the attack position AP of the opponent's character 23 and the present position of the leading character 22 computed in Step S9 and Step S10, the moving animation corresponding to the movement direction DE and the movement length L3 computed is composed and computed on the basis of the program FRG so as to display on the display 11.

Next, the CPU 2 executes Step S15 of the game proceeding program GPP, and executes the attack ball result computing routine of computing as to whether or not the ball attacked by the opponent's character 23 actually correctly reaches the attack position AP computed in Step S9 on the basis of the attack probability AR computed in Step S10 and a random number, and executes Step S16 through S19 according to the result computed.

When the computed result by the attack ball result computing routine is "IN", that is, the ball correctly reached the attack position AP computed and determined by the game proceeding program GPP in Step S9, the program enters into Step S16 so as to compute as to whether or not the leading character 22 catches up with the ball attacked, making use of the counterattack probability DR computed in Step S10 and a random number. When the judgement in Step S16 is that the leading character 22 caught up with the ball hit by the opponent's character 23, the program returns to Step S2 via Step S17. The game proceeding program GPP enters in the attack form determining mode MOD1 wherein the player inputs an attack form through the controller 14 within a limited time from the automatic proceeding mode MOD2 up to that time wherein the time in a game continuously passes at a constant speed corresponding to actual time.

In the automatic proceeding mode MOD2, the game proceeding program GPP gets the CPU 2 to control the time proceeding of a tennis game displayed and controlled on the display 11 through the picture processing unit 8 so as to proceed time at a constant speed corresponding to the actual time after determining the attack position AP of a ball or the kind of the attack ball by the player, that is, after instructing the attack form till the opponent's character 23 hits the ball so as to return the ball to the leading character 22 again, and gets the CPU to execute an attack/defense action processing routine of moving the characters 22, 23 on the court 20 on the basis of the attack form instructed by the player in the attack form determining mode MOD1. That is, the animation corresponding to Step S5, Step S6, Step S13, Step S14 is composed and displayed on the display 11. In the meantime, the data necessary for the counterattack processing by the opponent's character 23 are computed in Step S8, Step S9, Step S10 and Step S11, and the CPU 2 is controlled to prepare for computing the next counterattack action by the player, that is, the attack mode determining mode MOD1.

Therefore, the player can experience the result which the attack form determined and instructed through the controller 14 by his (her) own in the attack form determining mode MOD1, such as the attack position AP and the kind of a ball against the opponent's character 23 gives the opponent's character 23, or the counterattack form of the opponent's character 23 in the motions of the characters 22, 23 having the speed approximating to an actual game, under tension. In the automatic proceeding mode MOD2, the operation by the player through the controller 14 of quickly moving the leading character 22 to the attack position AP of the ball attacked by the opponent's character 23, that is, the operation depending on the reflexes of the player is not necessary, and all actions of the characters 22, 23 are automatically executed by the attack/defense action processing routine. Then, the development of a game changed by the attack form determined by the player in the attack form determining mode MOD1 can satisfy the player, giving the player spare time, and the feeling of intellectual satisfaction can be obtained. Besides, such a control so as to display splendid art (including hidden art) of the respective characters 22, 23 in the attack/defense action processing routine can widely raise the consciousness of the participation into the game scenario by the player, and such a control highly interests the player in the game.

When the program returns to Step S2 via Step S17 and enters into the attack form determining mode MOD1, the program FRG gets the CPU 2 to execute the time passage routine with a timer, and to control so as to display the result on the display 11 as the remaining time RT through the picture processing unit 8. Receiving this, the player determines and instructs the attack form of the ball against the opponent's character 23 from Step S3 to Step S4 within the remaining time RT. On this occasion, the movement length L3 of the leading character 22 computed in Step S14 when the last ball is received from the opponent's character 23 increases or decreases the parameter of the conditions fluctuation in computing the attack probability AR in Step S4.

When the judgement in Step S16 is that the leading character 22 did not catch up with the ball attacked by the opponent's character 23, the program enters into Step S18, and the scoring flag is made ON so as to score described hereinafter, adding a point to the opponent's character 23.

When the result computed by the attack ball result computing routine in Step S15 is "OUT", that is, the ball was not correctly smashed to the attack point AP computed and determined in Step S9, furthermore, the program enters into Step 19, and the scoring flag is made ON so as to score as described hereinafter, adding a point to the leading character 22.

In this way, tennis rally by the leading character 22 operated by the player through the controller 14 and the opponent's character 23 operated by the program FRG is continued till the issue of the game is settled.

When the scoring flag is made ON in Step Sit, Step S12, Step S18 and Step S19, the program enters in Step S20, and controls the CPU 2 to renew the point register set at a predetermined address position in the RAM 5 concerning the leading character 22 or the opponent's character 23 to whom the point is to be added and to renew the points of both displayed on the display 11.

In the above-mentioned embodiment, concerning the first character, such as the leading character 22, the player instructs the attack form, such as the attack position AP or the kind of the ball, through the controller 14, and concerning the second character, such as the opponent's character 23, the program FRG computes the attack form according to predetermined processing programs. But, an another player may instruct the attack form through the controller 14 concerning the second character 23 also so as to compose a pitched battle type of rally game with two players.

In the above-mentioned embodiment, the CPU 2 comprises a game control unit, and the combination of the CPU 2 and a specific software comprises various kinds of means of the game control unit, but at least a part of these means may be replaced by a logical circuit.

The present invention is not limited to the above-mentioned embodiment, and various kinds of forms can be executed. For instance, the present invention is not limited to a tennis game, but the present invention can be applied to all the pitched battle type of rally games wherein a rally is executed by hitting a game target, such as a ball of table tennis, badminton, volleyball or the like, by each other. And, the present invention is not limited to a home-use game system, but may be structured as the game system having various scales.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

The invention claimed is:

1. A pitched battle type of rally game program, stored on a machine-readable medium, for displaying and controlling said pitched battle type of rally game, said rally game for obtaining points by smashing a game target into a point area on an opponent side through a rally where said game target is moved between an opponent court and an own court which are set on a court, controlling to move a character displayed on a display at said court displayed on said display, comprising:

said pitched battle type of rally game program being a program for further getting a computer to execute the following routines:

a first smash form computing routine for computing and setting a target destination of said game target into said point area on said opponent side by a smash from a first character through an instruction of a player;

said first smash form computing routine having a routine for computing to divide said opponent court into a plurality of target destination areas, depending on a position in said own court of said first character and for setting a degree of smash difficulty of said game target for each said area, and attack probability computing and displaying routine for computing said attack probability in said target destination area through an instruction of said player concerning said target destination of said game target and for displaying said attack probability computed on said display;

an automatic proceeding mode routine for advancing the game without further instruction by said player after said target destination of said game target of said first character is computed and set by said first smash form computing routine;

a first display routine for controlling to display an attack action of said game target by said first character and a defense action corresponding to said attack action by a second character competing with said first character on said display with a series of pictures in said automatic proceeding mode; and a second display routine for controlling to display said attack action of said game target against said first character by said second character and said defense action corresponding to said attack action by said first character on said display with a series of pictures in said automatic proceeding mode.

2. The pitched battle type of rally game program according to claim 1 wherein said attack probability computing and displaying routine computes said attack probability in said target destination on the basis of parameters which depend on movement distance between a current position of said first character and a position where said first character will smash said game target from now on.

3. The pitched battle type of rally game program according to claim 1, further comprising a bodily powers value computing routine for computing a bodily powers value which shows consumable bodily powers of said first character in a game with said game target, and said attack probability computing and displaying routine computes said attack probability on the basis of said bodily powers value of said first character at the time of the smash, said bodily powers value being computed by said bodily powers value computing routine.

4. The pitched battle type of rally game program according to claim 3 wherein said attack probability computing and displaying routine computes an increase or decrease in said bodily powers value at the time of the smash, wherein the amount by which the bodily powers value increases or decreases varies according to a scenario development.

5. The pitched battle type of rally game program according to claim 1 wherein said pitched battle type of rally game program being said program for getting said computer to further execute a time limiting routine, for starting to clock a predetermined time since said first smash form computing and setting routine is started and for controlling to limit the execution of said first smash form computing and setting routine within said predetermined time.

6. The pitched battle type of rally game program according to claim 1, wherein said first smash form computing routine has a counterattack probability computing and displaying routine, for computing a counterattack probability at said target destination by said second character in response to said instruction by said player concerning said smash destination of said game target on the basis of said parameters which depend on a movement distance from position where said second character just before smashed said game target against said first character to a position where said second character will hit said game target from now on, and for displaying said computed counterattack probability on said display.

7. The pitched battle type of rally game program according to claim 6 wherein said counterattack probability computing and displaying routine computes said counterattack probability on the basis of said bodily powers value which shows said consumable bodily powers of said second character when defending said game target.

8. The pitched battle type of rally game program according to claim 7 wherein said counterattack probability computing and displaying routine computes to increase or decrease said bodily powers value which shows said consumable bodily powers of said second character on the basis of said parameters which fluctuate according to said scenario development, and computes said counterattack probability on the basis of said bodily powers value of said second character which has been increased or decreased.

9. The pitched battle type of rally game program according to claim 1, wherein said pitched battle type of rally game program is said program for further getting said computer to execute a second attack form computing and setting routine for computing and determining said attack form of said game target against said first character by said second character.

10. The pitched battle type of rally game program according to claim 9 wherein said second attack form computing and settling routine has a routine for computing and determining said attack form of said game target on the basis of an instruction of said player.

11. A pitched battle type of rally game program for displaying and controlling said pitched battle type of rally game with a computer, said rally game for smashing said game target by first and second characters between an opponent court and an own court which are set on a court, controlling to move said first and second characters displayed on a display at said court displayed on said display, comprising:

said pitched battle type of rally game program being a program for getting said computer to alternately repeat following a series of routines for said first and said second characters till rally finish is judged in a judging routine:
  (a) an attack form computing and setting routine for computing and setting said smash destination of said game target by said character and computing and setting an attack probability at said attack position; and
  (b) said judgment routine for judging as to whether or not said rally is finished on the basis of said smash destination and said attack probability computed and set, and a position of other character rather than said character on said court; and said attack form computing and setting routine having a routine for computing to divide said opponent court into a plurality of target destination areas, depending on a position in said own court of said first character or said second character and for setting a degree of smash difficulty of said game target for each said area, and a routine for computing said attack probability in said target destination on the basis of said degree of difficulty which is set on said each target destination of said game target and for displaying said computed attack probability on said display, wherein said target destination is computed on the basis of an input signal from said controller of said computer for at least one character of said first and said second characters in said attack form computing routine.

12. A game machine, having a display, said game machine for displaying and controlling a pitched battle type of rally game for obtaining points by smashing a game target into a point area on an opponent side through a rally of said game target is moved between an opponent court and an own court which are set on a court, controlling to move a character displayed on a display at said court displayed on said display, said game machine comprising,;

a first smash form computing means, for computing and setting a target destination of said game target into said point area on said opponent side by smash from a first character through an instruction of a player;

said first smash form computing means having means for computing to divide said opponent court into a plurality of target destination areas, depending on a position in said own court of said first character and for setting a degree of smash difficulty of said game target for each said area, and an attack probability computing and displaying means, for computing said attack probability in said target destination on the basis of said degree of smash difficulty which is set on each said target destination area through an instruction of said player concerning said target destination of said game target and for displaying said attack probability computed on said display;

an automatic proceeding mode proceeding means for advancing a game without further instruction by said player after said target destination of said game target of said first character is computed and set by said first smash form computing means;

a first display means for controlling to display an attack action of said game target by said first character and a defense action corresponding to said attack action by a second character competing with said first character on said display with a series of pictures in said automatic proceeding mode by said automatic proceeding mode; and a second display means for controlling to display an attack action of said game target against said first character by said second character and a defense action corresponding to said attack action by said first character on said display with a series of pictures in said automatic proceeding mode by said automatic proceeding mode.

* * * * *